United States Patent [19]

Koike et al.

[11] Patent Number: 5,727,604
[45] Date of Patent: Mar. 17, 1998

[54] APPARATUS FOR COATING PASTY MIXTURE AND METHOD FOR COATING THE PASTY MIXTURE

[75] Inventors: Yukio Koike; Chitoshi Hara; Masao Nakamura, all of Chigasaki; Mitsuyoshi Kio, Fujisawa; Tetsushiro Torigoe, Wakayama, all of Japan

[73] Assignee: Matsushita Electric Industrial Co., Ltd., Osaka-Fu, Japan

[21] Appl. No.: 508,571

[22] Filed: Jul. 27, 1995

[30] Foreign Application Priority Data

Jul. 28, 1994 [JP] Japan .................... 6-176854
Jul. 5, 1995 [JP] Japan .................... 7-169462

[51] Int. Cl.⁶ .................................................. B65B 1/04
[52] U.S. Cl. .................... 141/1.1; 141/32; 141/280; 29/623.5; 118/122; 118/677
[58] Field of Search .................... 141/1.1, 83, 98, 141/32, 33, 280; 29/623.5; 118/122, 680, 681, 679, 677

[56] References Cited

U.S. PATENT DOCUMENTS 3,575,134  4/1971  Quint ........................... 118/122
4,878,522  11/1989  Ostrander.

FOREIGN PATENT DOCUMENTS 1 555 186  1/1969  France.
54-98267   8/1979  Japan.
759 790   10/1956  United Kingdom.
962 473    7/1964  United Kingdom.

Primary Examiner—Henry J. Recla
Assistant Examiner—Steven O. Douglas
Attorney, Agent, or Firm—Panitch Schwarze Jacobs & Nadel, P.C.

[57] ABSTRACT

Weight of the paste (21) per area is measured continuously without contact by irradiating the belt-shaped paste-coated punched metal electrode (41) with β ray (51), during running of the electrode (41) on a production line, then trapping dosage of the β ray radiation transmitted through the electrode (41) by an ionization chamber (4b, 50), followed by processing the measured value in a micro-processor unit (6) on the basis of comparing with a previously determined reference value. BY means of the output signal from the processor (6), the gap of slit (24) between the blades (23a and 23b) is feedback-controlled, so as to control thickness, hence weight per unit area of the pasty mixture uniform.

18 Claims, 12 Drawing Sheets

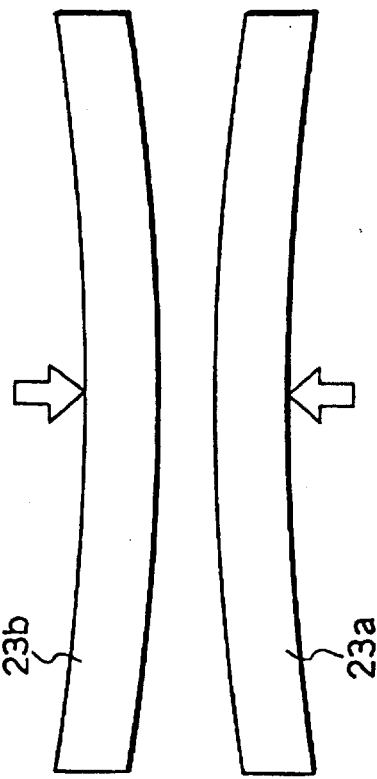
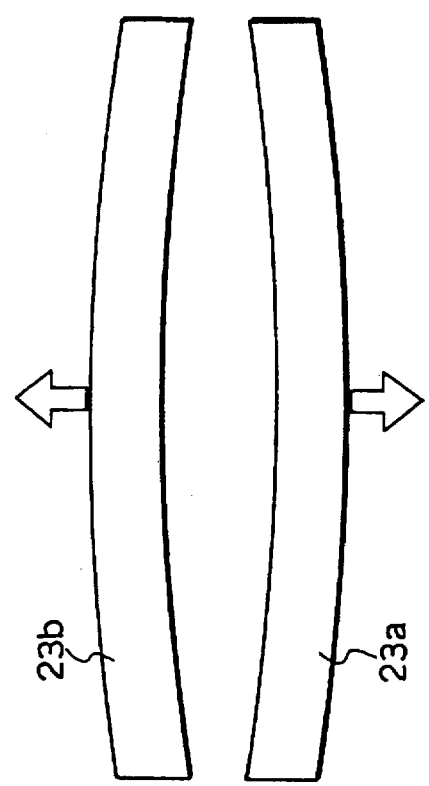
FIG. 12 (A)
FIG. 12 (B)

APPARATUS FOR COATING PASTY MIXTURE AND METHOD FOR COATING THE PASTY MIXTURE

BACKGROUND OF THE INVENTION

1. Field of the Invention

The present invention relates to an apparatus for continuously coating on a belt-like metal core sheet a pasty material, in particular, a pasty mixture containing an electrode active material as its main ingredient, and also relates to a method for coating the same using such an apparatus.

2. Description of the Related Art

As the batteries, which are widely used as power sources in a variety of electric appliances, there are alkaline storage batteries, lithium batteries and the like. These batteries tend to be made more reliable, and can be made smaller and lighter. Based on these reasons, ones with small sizes are generally favored for portable electric appliances, while ones with larger sizes have been used mainly in conjunction with industrial equipments.

As the electrodes employed in a configuring these batteries, there are a nickel electrodes for cathodes and cadmium electrodes or hydrogen storage alloy (metal hydride) electrodes for anodes in the cases of the alkaline storage batteries. In the cases of the lithium batteries, lithium oxide electrodes and graphite electrodes are common. There is such a conventional coating process, that a pasty mixture containing powder of the electrode active material as its main ingredient is coated on a core material, as frequently employed manufacturing methods for the above-mentioned electrodes represented by the cadmium electrode and the recent hydrogen storage alloy (metal hydride) electrode. That is, these electrodes are produced in general, first by coating the pasty mixture consisting mainly of the desired powder and a solution of a binding agent to made a layer on a porous core material of such a structure as a screen, an expanded metal sheet, a punched or perforated metal sheet, a sponge metal or the like; then followed by thickness-adjusting of the coated layer and simultaneously smoothing its surface by making the coated core material to pas through a slit; and thereafter dried.

The above-mentioned manufacturing method of the electrodes employing the pasty mixture has an advantage that the coating or filling of the active material on or in the core material can be performed easily, and that the process is excellent for continuous production and mass production. Thereby cost of the battery or the electrode is suppressed in a reasonable range. As binding agent for the pasty mixture of the cadmium electrodes polyvinyl alcohol is usually used, and as well, other binding agents such as carboxymethyl cellulose, polyethylene, polyvinyl chloride, a styrene-butadiene synthetic rubber, polyfluorocarbon resin, or the like can be used for configuring the electrodes. As the core material of electrically conductive porous body, among the hitherto used expanded metal sheet, screen, punched or perforated metal sheet and the like have since been used, recently becomes the punched or perforated metal sheet most popular because of its advantage in the point of view of its price and strength.

Hitherto, measurements of weights per units of these electrode configured with the pasty mixture have been performed by sample-cutting an arbitrary part of the electrode after the drying of the coated pasty mixture to give a sampled piece of a predetermined constant size, and by mechanically measuring the weight of the campled piece. Therefore, a continuous measurement of the weight of the pasty mixture had not been performed so far.

On the other hand, as a method for measuring the weight per unit area of a sheet of paper, film, textile, iron or the like, such a method has been proposed and disclosed and used to irradiate the sheet with a radiation and measure the dosage of the radiation transmitted through the sheet in, for instance, Japanese Laid-Open Patent Publication No. Shoe 54-98,267. However, the disclosed method of using the radiation has not totally been applied to the measurement of the weight per unit area of the pasty mixture coated-type electrode, because of problem in poor preciseness of the measurement of such a complicated composition as the paste coated-type electrode of the above-mentioned core material provided with the layers of the active material composed mainly of a metal or its compounds on both the surfaces thereof.

In the manufacturing process of the above-mentioned pasty mixture coated-type electrode, it is difficult to continuously produce an electrode having a uniform weight per unit area. If the amount of the pasty mixture for coating and filling is nonuniform, the amount of the pasty mixture to be coated or filled varies or deviates from an average value when the core sheet is cut into a unit electrode plate, resulting in a deterioration of quality of a battery configured with such electrode plate.

For this reason, in the production process of the electrode using the pasty mixture, it has been required to frequently examine the electrode obtained by coating the pasty mixture on the core material whether the coating is under a desired condition or not, so as to take a countermeasure in the case that any inconvenience occurs. As the method of coping with the inconvenience, measurement of weights per unit area of these electrode configured with the pasty mixture by mechanical sampling of some parts of the electrode after the drying of the coated pasty mixture followed by measuring the weighting of the sampled piece, were hitherto used for adjusting the amount of the pasty mixture for the coating.

In such conventional method, when the larger the part for the sampling is made and the more frequently the sampling area, the higher the precision of the measurement will become. However, parts of the vicinity of the sampled parts, not to mention of the sampled parts themselves, cannot be used as the electrode. Thus, the method seriously lowers yield of the production if a high precision of the measurement is required. Further, since the result cannot be obtained immediately, the countermeasure cannot immediately be applied to the production of the electrode even if any abnormality is found. Further, the method has another disadvantage in the complexity of the adjusting operation.

OBJECT AND SUMMARY OF THE INVENTION

The present invention intends to overcome the previously mentioned disadvantages and deficiencies of the prior art, and has, as its principal object, a provision of a method for measuring the weight of the pasty mixture coated on a core sheet. The disclosed method is capable of continuously measuring the weight of the pasty mixture on a non-contact basis.

Another principal object of the present invention is to provide an apparatus for coating the pasty mixture. The disclosed apparatus is capable of always making the coated amount of the pasty mixture to get close to a designed target value, by reflecting the result of the above-mentioned measurement on the adjustment gap of a slit between a pair of blades for controlling the coated thickness of the pasty mixture.

Another object of the present invention is to trap the dosage of the radiation which has transmitted through the pasty mixture coating, by an ionization chamber, to obtain an ionization current issued in compliance with the dosage. Thereby the ionization current is inputted to a processing unit, wherein it is processed by comparing it with reference data of the previously determined weight of the pasty mixture, to obtain an electric output signal. By using the output signal at least one of the blade constituting a slit is displaced for controlling the coated amount of the pasty mixture, thereby to constantly adjust the slit gap.

A still further object of the present invention is to configure the radiation source with a piece of strontium 90 which emits β ray, so as to make the transmission of the radiation through the pasty mixture coated core sheet preferably to give a high accuracy to the measurement on the weight of the pasty mixture per unit area of the core sheet.

A fourth object of the present invention is to configure a weight measuring unit, whereby the radiation source and the ionization chamber constitute a facing pair, between which the pasty mixture-coated metal core sheet is transferred in a given direction. And the radiation source and the ionization chamber constituting the weight measuring unit traverse across the width of the pasty mixture coated metal core sheet, thereby to continuously measure the weight of the pasty mixture and thus to constantly grasp the weight of the pasty mixture at a high accuracy.

Other objects of the present invention and attendant advantage thereof will be clarified in the following summary of the present invention and the description on preferred embodiments.

In order to attain the above-mentioned objects, the apparatus for coating pasty mixture in accordance with the present invention comprises:

means mounted on a stationary part of the apparatus for transferring a continuous belt-like metal core sheet along a predetermined transferring path along which a plurality of processing stations are provided;

a hopper which contains the above-mentioned pasty mixture containing an electrode active material as its main ingredient, through which the above-mentioned continuous belt-like metal core sheet passes, for coating the pasty mixture on both faces of the metal core sheet thereby to form layers on respective faces;

a slit which is provided at outlet part of the hopper constituted with a pair of blades made of an ultra hard alloy (cemented carbide), through which the metal core sheet with coatings of the pasty mixture passes, whereby the thickness of the above-mentioned coated layers of the pasty mixture are adjusted;

a furnace for drying the coatings of the pasty mixture;

a weight measuring unit including a radiation source provided over one side of the above-mentioned predetermined transferring path, for irradiating the metal core sheet with coatings of pasty mixture with a radiation, and an ionization chamber provided over the other side of the transferring path for detecting trapped dosage of the radiation transmitted through the metal core sheet with coating of pasty mixture, to issue an electrical output signal corresponding to the dosage, a processing unit for processing the electrical output signal form the weight measuring unit by comparing it with reference data which is based on a previously measured and determined weight of the pasty mixture, thereby issuing a control signal, and means for adjusting a gap between the above-mentioned pair of blades, in compliance with the control signal outputted from the above-mentioned processing unit.

In the above-mentioned apparatus, suitable radiation for irradiating the layers of the coated pasty mixture depends on the material for constituting the pasty mixture and, β ray is preferred because of its excellent transmitting ability, and use of a piece of strontium 90 is suited as the radiation source for said β ray.

In a case wherein the main ingredient for constituting the pasty mixture is cadmium or cadmium oxide powder, it is preferable that reference data should be previously determined by using iron as a reference sample on account of the reason described later.

A method for continuously coating on a continuous belt-like metal core sheet a pasty mixture containing an electrode active material powder as its main ingredient comprising the steps of:

continuously coating on both faces of the metal core sheet the pasty mixture by allowing the metal core sheet to pass through a hopper which stores the pasty mixture therein;

adjusting the thickness of the coated pasty mixture by allowing the metal core sheet to pass through a slit for adjusting the coated pasty mixture, the thickness being defined by gap of the slit between a pair of the blades and situated close to the hopper;

drying the metal core sheet which has been coated with the pasty mixture;

irradiating the coated and dried metal core sheet with a radiation omitted form a radiation source in a pasty mixture weight measuring unit, trapping dosage of the radiation transmitted through the coated and dried metal core sheet by an ionization chamber and then measuring the weight of the pasty mixture based on the dosage obtained by the trapping operation;

processing the measured value by comparing it with a previously determined reference value of the weight of the pasty mixture and outputting the result of the comparison as an electrical signal; and adjusting a gap of slit by displacing at least one of the blades by at least one driving source which operates in compliance with the electrical signal, thereby to adjust constant the weight per unit area of the pasty mixture coated on the metal core sheet.

According to the above-mentioned configuration and method, the present invention enables the continuous measurement of the coated amount of the pasty mixture possible without contacting the pasty mixture, and can produce an electrode plate comprising a core sheet coated with uniform layers of the pasty mixture in a large quantity.

While the novel features of the present invention are set forth particularly in the appended claims the invention, both as to organization and content, will be better understood and appreciated, along with other objects and features thereof, from the following detailed description taken in conjunction with the attached drawings.

BRIEF DESCRIPTION OF THE DRAWINGS

FIG. 12(A) and FIG. 12(B) are front cross-sectional views showing the pair of the blades shown by FIGS. 10 and 11 in their warped state.

DESCRIPTION OF THE PREFERRED EMBODIMENTS

In the following paragraphs, the present invention will be described to the more detail by way of its preferred embodiment, with reference to the attached drawings.

Figure 1:
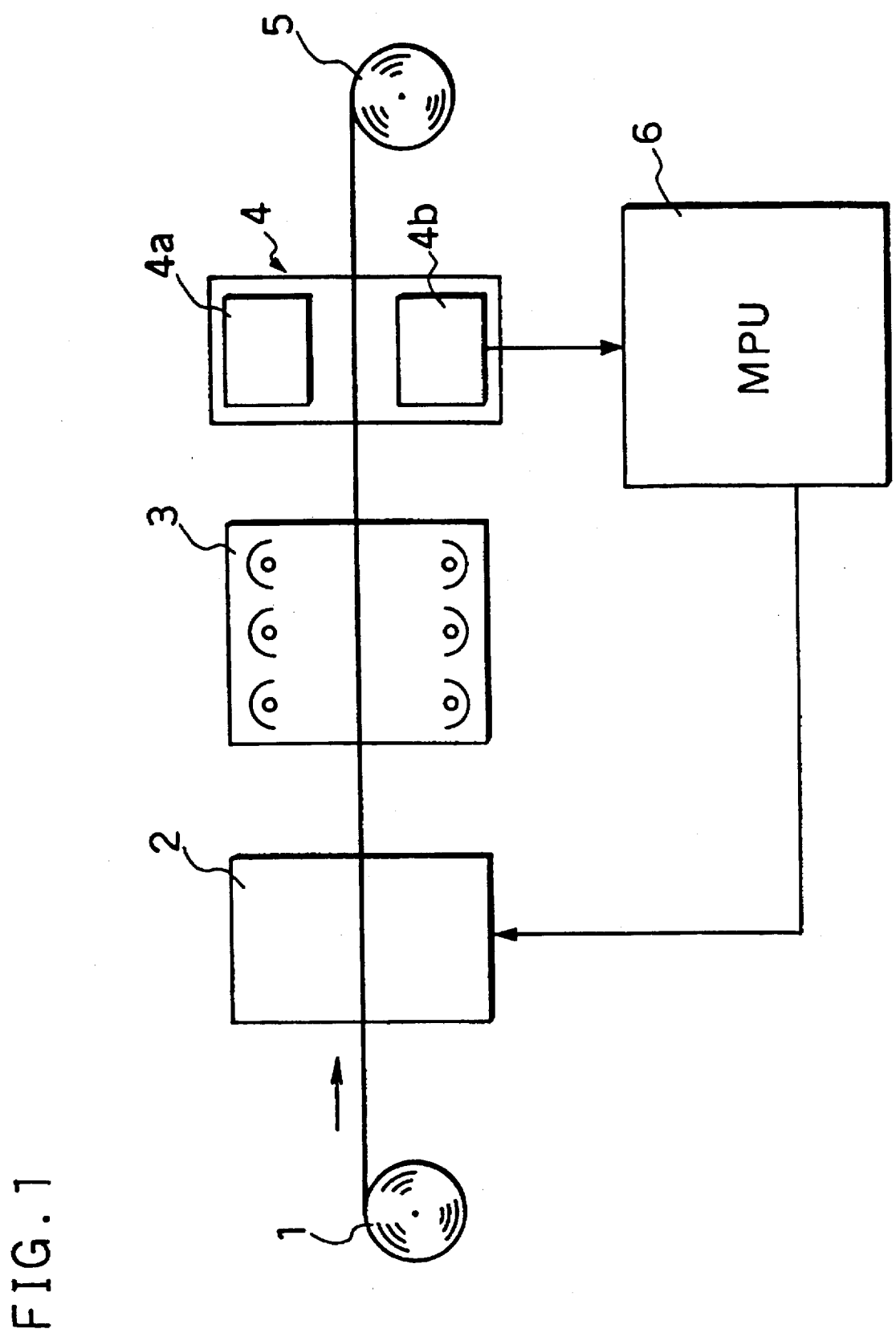
FIG. 1 is a schematic view showing an electrode plate manufacturing process of cadmium electrode configured in accordance with an embodiment of the present invention.

FIG. 1 is a schematic view showing an electrode plate manufacturing process of a cadmium electrode, whereby a pasty mixture composed mainly of cadmium oxide powder is coated on a continuous belt-like metal core sheet. In FIG. 1, a punched or perforated metal sheet 1 as the core sheet is made of iron plated with nickel and having a thickness of about 0.1 mm, has pore size of 1.8 mm, perforation rate of 53%, a width of 600 mm and a length of about 600 m; and it is wound in a coil.

In a pasty mixture coating process 2, both sides or both faces of the punched or perforated metal sheet 1 is coated with a pasty mixture. The pasty mixture is prepared by mixing and kneading ingredient of cadmium oxide powder as the active material, polyvinyl alcohol as binding agent and ethylene glycol as solvent.

The coating process 2 is followed by a drying process 3, a weight measuring unit 4 and a winding into a coil 5. A processing unit 6 processes a value measured at the weight measuring unit 4 by comparing and calibrating it with a reference value and issues an output signal which is fed-back to a blades-adjusting mechanism in the pasty mixture coating process 2. Although in this example, the weight measuring unit 4 is provided after the drying process 3, alternatively the weight measuring unit 4 may be provided prior to the drying process 3 if the solvent is considered as an object of the weight measurement.

Figure 2:
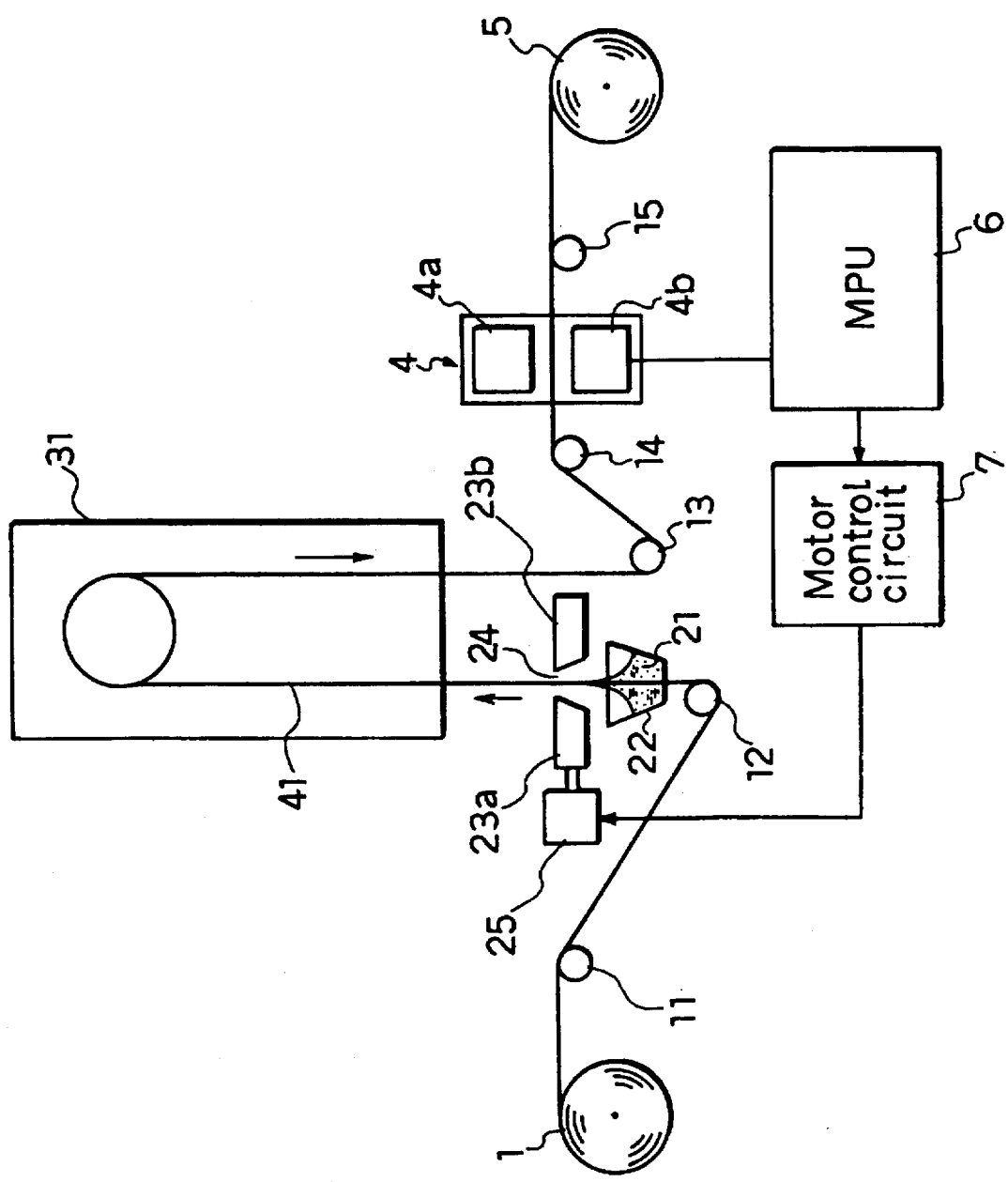
FIG. 2 is a schematic view showing a continuous manufacturing apparatus of a cadmium electrode of the shown embodiment.

A continuous cadmium electrode plate manufacturing apparatus in accordance with the pasty mixture coating unit of the present invention shown by FIG. 1 has a general configuration as shown by FIG. 2. In FIG. 2, the punched or perforated metal sheet 1 wound in a coil is transferred by a winding force of the winding unit 5 from the left to the right of the figure at a speed of for instance 50 mm/second, in this example, which speed is experimentally found suitable for the pasty mixture coating and the drying process.

In this apparatus, the punched or perforated metal sheet 1 is transferred by being guided by guide rollers 11, 12, 13, 14 and 15 and is finally wound again in a coil at the winding unit 5.

After passing through the guide roller 12, the belt-like punched or perforated metal sheet 1 is introduced into a hopper 22 which stores the above-mentioned pasty mixture 21 composed mainly of cadmium oxide powder. Both sides or both faces of the sheet are coated with the pasty mixture during its travel from the bottom to the top of the hopper 22. The coated sheet 1' is then pulled upward and the thicknesses and the weights of the coated layers of the pasty mixture are measured for adjustment and controlling of the coated pasty mixture during a passage through a slit 24. The slit 24 is constituted with a pair of blades 23a and 23b mounted above the hopper 22. In this example, the thickness of the coated layer on each side of the punched perforated metal sheet 1 is set to 0.75 mm and the weight per unit area on each side of the metal sheet is set 0.25 g/cm$^2$, respectively.

Figure 3:
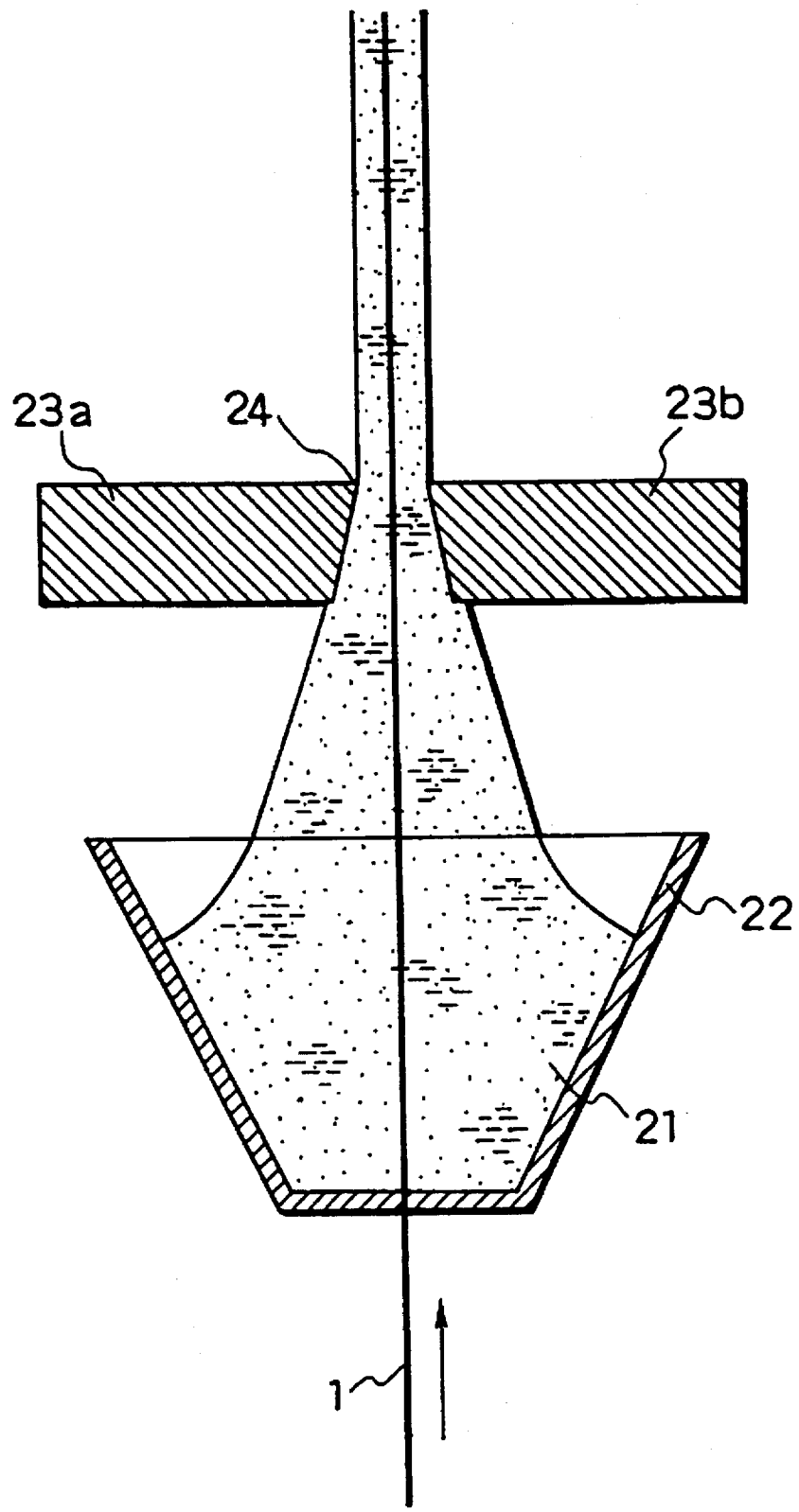
FIG. 3 is a schematic view showing a hopper filled with a pasty mixture and a pair of blades in the continuous manufacturing apparatus of a cadmium electrode of the shown embodiment.

Details of this process is illustrated by FIG. 3. The pairs of the blades 23a and 23b defining the slit 24 are provided with a pair of gap adjusting devices 25a and 25b, which will be described later.

The core metal sheet which was coated with the pasty mixture and has passed through the slit 24 between the pairs of the blades 23a and 23b is then introduced into a drying furnace 31 situated above the slit 24, and the solvent of the pasty mixture, i.e. ethylene glycol, is heated therein to escape therefrom, thereby to securely fix the pasty mixture to the core material composed of the punched or perforated metal sheet. Settings of furnace temperature and drying time period at this drying furnace depend on and are influenced by the coated state of the pasty mixture. A temperature at an inlet side of the drying furnace is set about 180° C., a temperature at the vicinity of a returning roller in the mid part of the drying furnace is set about 180° C., and a temperature at an outlet side of the drying furnace is set about 130° C. The transferring speed of the punched or perforated metal sheet is set so that the drying process can be performed for 5 minutes, respectively in this example. After drying, the core material coated with the pasty mixture is then guided to be introduced into the weight measuring unit 4.

Figure 4:
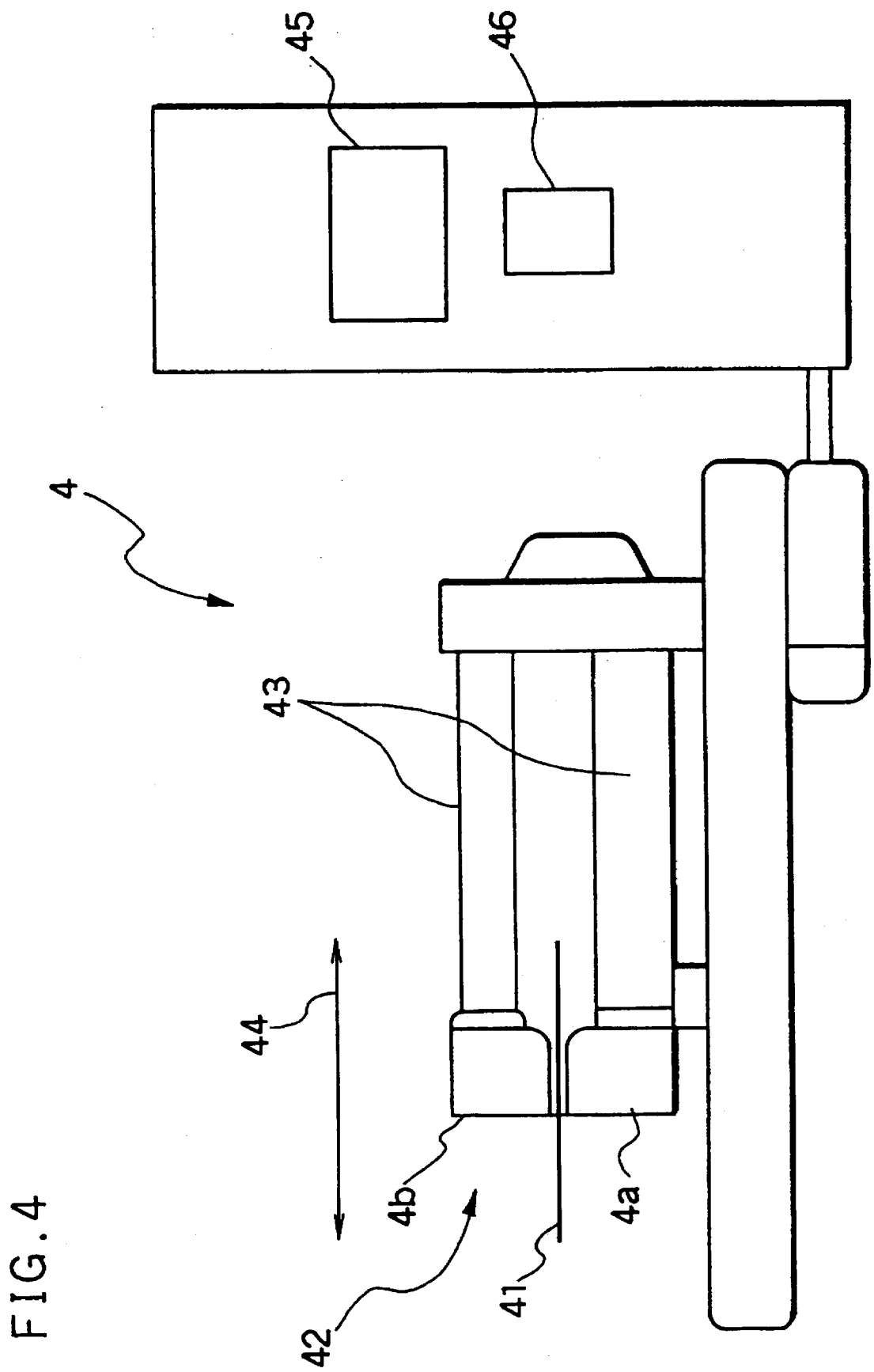
FIG. 4 is a schematic view showing a weight measuring unit for measuring the weight of the coated pasty mixture in the continuous manufacturing apparatus of a cadmium electrode of the shown embodiment.

FIG. 4 is a schematic representation of this weight measuring unit 4. In FIG. 4, the metal core sheet 41 coated with the pasty mixture 21 and having been dried, i.e. the belt-like electrode, is transferred through a detecting unit 42 which is supported by a beam-type frame 43. The detecting unit 42 comprising a radiation source 4a and an ionization chamber 4b reciprocates in the direction and range indicated by an arrow 44, so as to uniformly scan the belt-like electrode across and along its width for evenly measuring its weight per unit area. The weight measuring unit 4 also includes a display unit 45 and a manipulating unit 4b.

Figure 5:
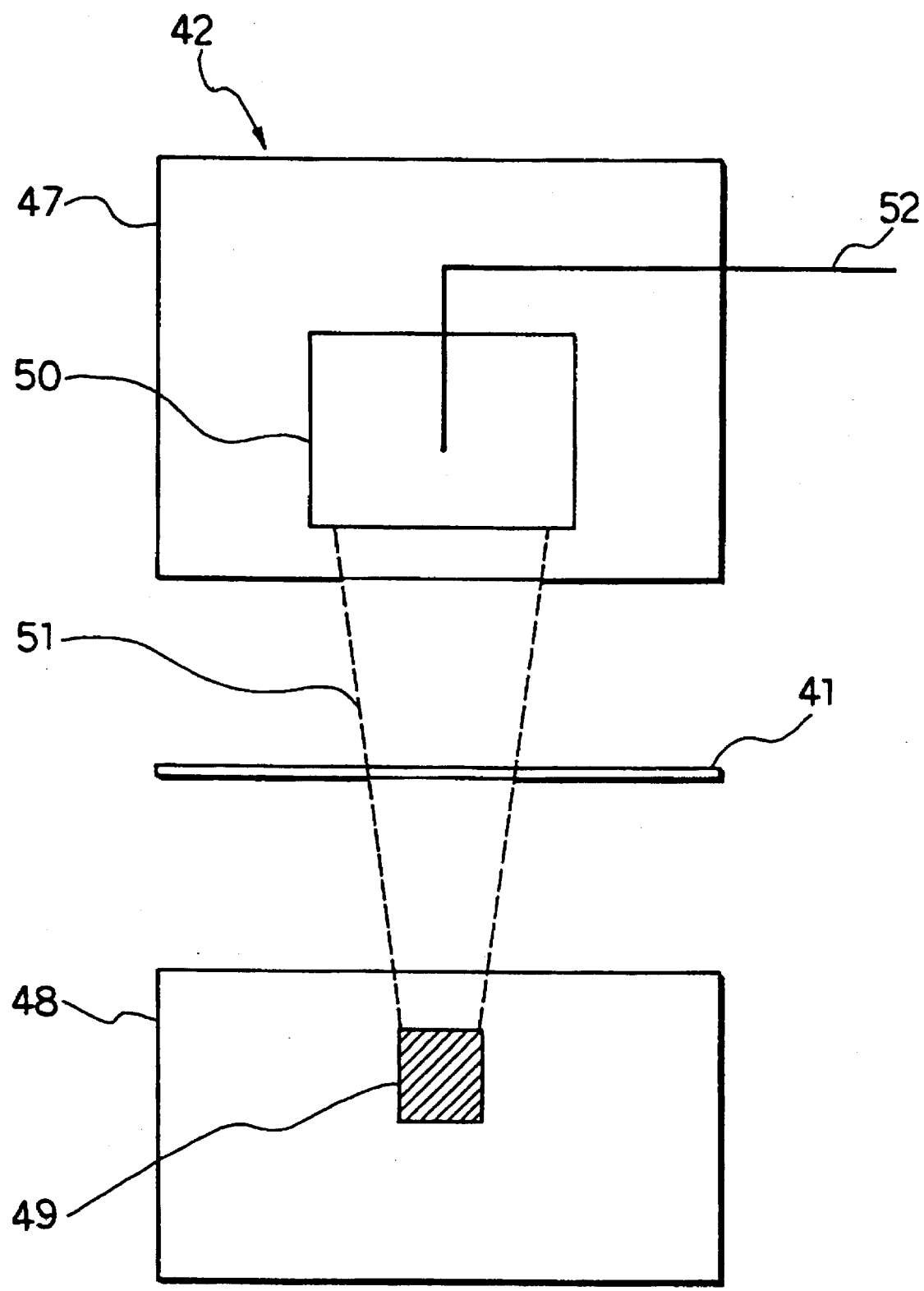
FIG. 5 is a schematic view showing a concrete detecting device in the measuring unit.

FIG. 5 is a schematic view of the detecting unit 42 which includes a pair of, namely upper and lower detecting heads 47 and 48. As β ray radiation source 49 of a radioactive material, strontium 90 ($^{90}$Sr), is housed in the lower detecting head 48, and an ionization chamber 50 as a receiver is housed in the upper detecting head 47, respectively. The β ray 51 emitted from the radiation source 49 transmits through the electrode 41 to reach the ionization chamber 50, which then issues an ionization current output on a line 52 to be taken-up.

Figure 6:
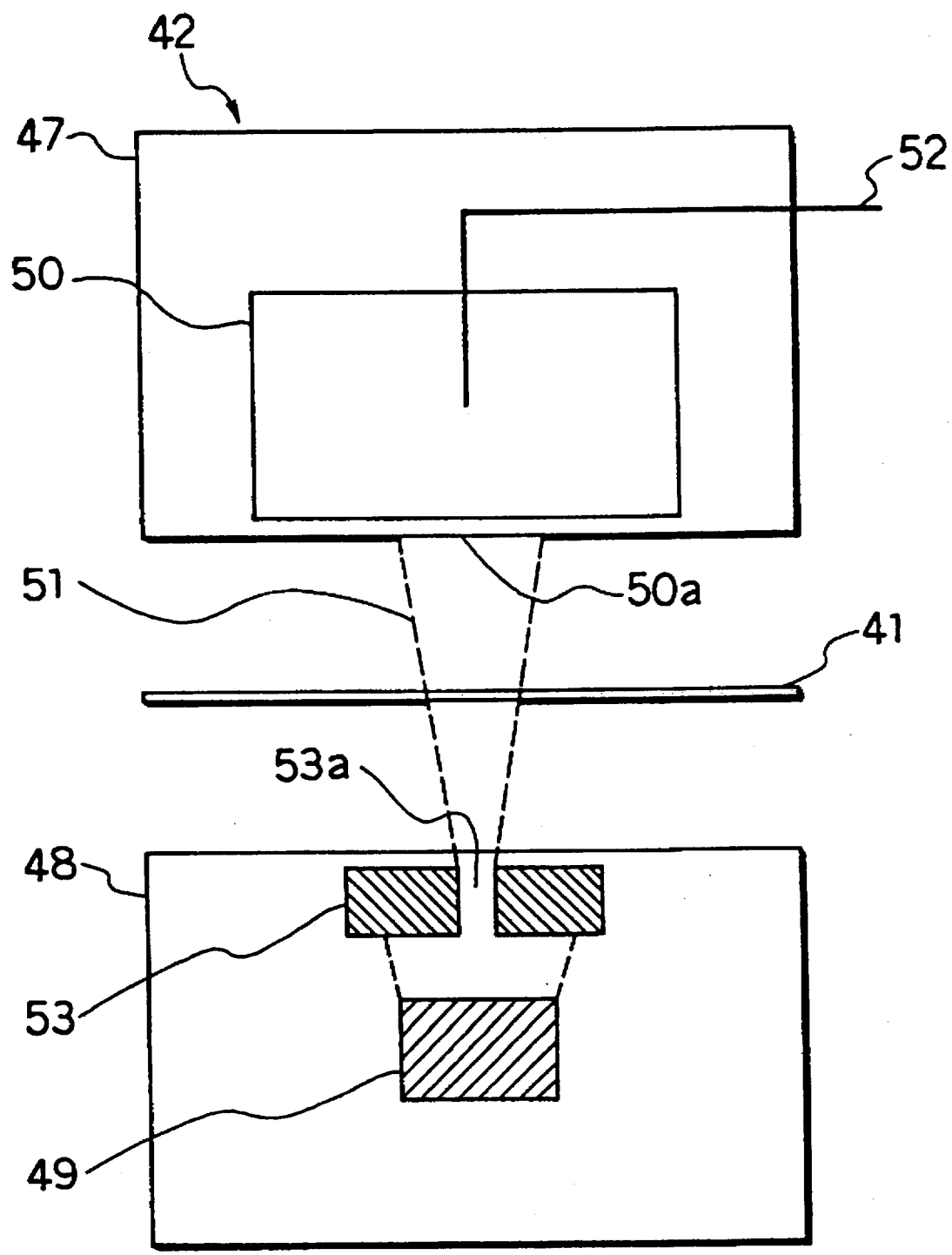
FIG. 6 is a schematic view showing a configuration of the concrete detecting device.

As shown by FIG. 6, the detecting unit 42 in a practical use is also provided with a collimator 53 with a slit 53a having a width of 2 mm and a length of 6 mm situated over the β ray radiation source 49 as a stop for controlling the β ray. By this means, the β particles from the radiation source 49 can impinge upon the electrode plate 41 in a unit exposition or target area having a width of 20 mm and a length of 60 mm.

The collimator 53 is made of brass and provided with the above-mentioned slit 53a of 2 mm width and 5 mm length on its center. The β ray radiation source 49 is enclosed by a radiation shielding material except for a part of its top, and its irradiation angle and area for the β ray are limited by the collimator 53 which is situated over the source as shown by FIG. 6. Therefore, the electrode plate 41 is irradiated with the β ray in the desired exposition or target area having the width of 20 mm and a length of 60 mm, and the β particles transmitted through the electrode plate 41 arrive at the ionization chamber 50.

The ionization chamber 50 is composed of a box whose lower inlet opening is closed with a thin film 50a which allows a transmission of the β ray therethrough. Inside the box, there is confined a dried inert gas, for instance argon or the like gas, and a central electrode and a peripheral electrode are concentrically disposed. A d.c. voltage of about 300 V is applied across a known central electrode and a known peripheral electrode. As shown by FIG. 6, the β ray which has transmitted through the electrode plate 41 enters inside of the box through the thin film 50a on the bottom face of the ionization chamber 50; and the β ray ionizes the gas confined therein to produce ions in correspondence with the intensity or the dosage of the ray (the amount of the impinged β particles). The ions are collected by both electrodes, and is taken up as an ionization current from an output terminal to the line 52.

As shown by FIG. 4, the detecting unit 42 is designed so that the radiation source 4a and ionization chamber 4b are forming a facing pair of an under and an over units, and is reciprocatingly traversing along the width of the electrode plate 41, which is being transferred to the winding-up unit, across full width of the electrode plate, at a speed of about 1.7 m/minutes.

The ionization current which is proportional to the intensity or dosage of the transmitted β rays and outputted form the ionization chamber 50 is then introduced into a processing unit 6 composed essentially of a micro-processor unit (MPU). In the micro-processor unit, the introduced output current is processed by comparing it with a reference value, and the comparison result is outputted as an electric signal. The output signal is fed to a motor controlling circuit 7, which drives a blade adjusting mechanism 25 (FIG. 2) to actuate the motors, stepping motors or servo motors. Thereby the slit gap between the pair of the blades 23a, 23b are adjusted so as to be constant. Details or the adjustment operation will be described later.

As radiations available for irradiating the core sheet coated with the pasty mixture consisting mainly of cadmium oxide powder, X-ray, γ ray or β ray are available. The inventors have paid an attention to the empirical fact that the β ray has a small difference in mass absorption coefficient in terms of the species of the materials. After examining radiation sources for the β ray, radioactive materials of krypton 85 (energy: 0.22 MeV), promethium 147 (energy: 0.67 MeV), and strontium 90 (energy: 2.27 MeV), it is found that the strontium 90 is the most suited for the points of weight measurement of the pasty mixture in viewpoints of a larger transmitting energy, a safety and a stability for a long period of time.

Attenuation of the β ray emitted from the radiation source 4a, of strontium 90 effected by the transmission through the pasty mixture-coated metal core sheet 41 is represented by the following equation:

$$I = I_o \exp(-\mu \cdot T)$$

wherein,

I represents an intensity of the radiation after the transmission, $I_o$ represents an intensity of the radiation before the transmission, μ represents a mass absorption coefficient (m²/g) determined by the energy of the radiation and the material through which the radiation transmits, and T represents the weight (g/m²).

Therefore, it is theoretically possible to perform a weight per area measurement by deriving the mass absorption coefficient of the pasty mixture-coated metal core sheet (electrode plate). However, a practical mass absorption coefficient cannot be obtained in case of the cadmium electrode, because a sample having a sufficient precision in its weight cannot be produced owing to complex composition of the Cd paste. Therefore, silver, iron and aluminum are taken-up, as reference sample materials capable of producing samples having sufficient precision in its weight in place of the cadmium electrode. Then, their mass absorption coefficients are obtained and employed as reference data for deriving the controlling or calibrating values. These reference sample materials can be worked with high precision and have a characteristic of the long-term stability.

Figure 7:
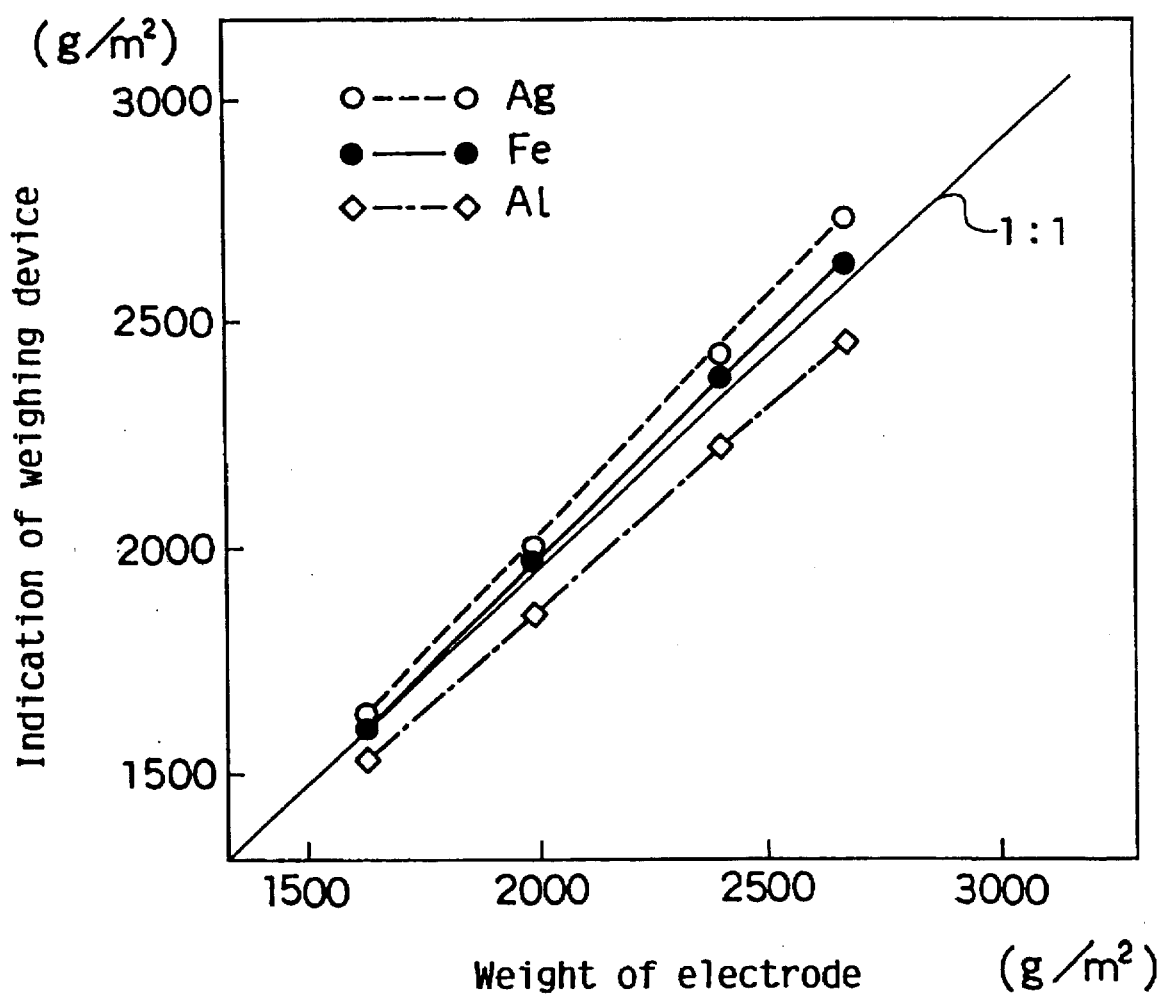
FIG. 7 is a diagram showing a relationship between value indicated by the weight measuring device and the weight of the electrode.

FIG. 7 is a diagram showing the relationships between values indicated by a weighting device and the actual measured weights of the electrode plates. The values from the weighing device are obtained by irradiating the cadmium pasty mixture-coated core sheet, in a state of being transferred at a speed of 20 mm/second, with the β ray emitted from the radiation source of strontium 90 having an energy of 2.27 MeV and a half-life of 28.8 years, then by trapping the β ray transmitting through the core sheet coated with the pasty mixture of iron, aluminum or silver as the reference sample, and by converting the intensity or dosage of trapped radiation into a weight. As a result, it is experimentally found that out of the tested reference samples of silver, iron and aluminum, the iron is the most excellent as a reference sample for the cadmium electrode. The basis for this is that the iron demonstrates a relationship which is the most close to the relationship of 1:1, between the indication by the weighing device in which the actual weight of the cadmium electrode and each of the mass absorption coefficients of the reference materials, and the weight of the electrode plate are incorporated.

Apart form the above-mentioned description which are limited to that of the paste coated-type cadmium electrode, for another case of selecting a reference sample for the other paste coated-type electrode such as nickel electrode, hydrogen storage alloy electrode or the like, a similar manner to the afore-mentioned description can be applied.

The electric output signal 52 derived from the detecting unit 42 of the weight measuring unit 4 is inputted to the micro-processor unit 6. The micro-processor unit compares the inputted signal and makes calibration with the reference date on the weight of the pasty mixture, which are previously determined based on the above-mentioned reference sample, iron. The result of the comparison and calibration by the micro-processor 6 is fed, as the output of the weight measuring unit 4, to a motor controlling circuit 7. The output constantly actuates the blade adjusting mechanism 25 in a manner that the gap between the pair of the blades 23a and 23b, namely, the gap for adjusting the thickness of coated pasty mixture can always be made to get close to a target value, i.e., a standard predetermined value.

Details of this adjustment operation will be described as follows by referring to FIG. 8 through FIG. 10.

Figure 8:
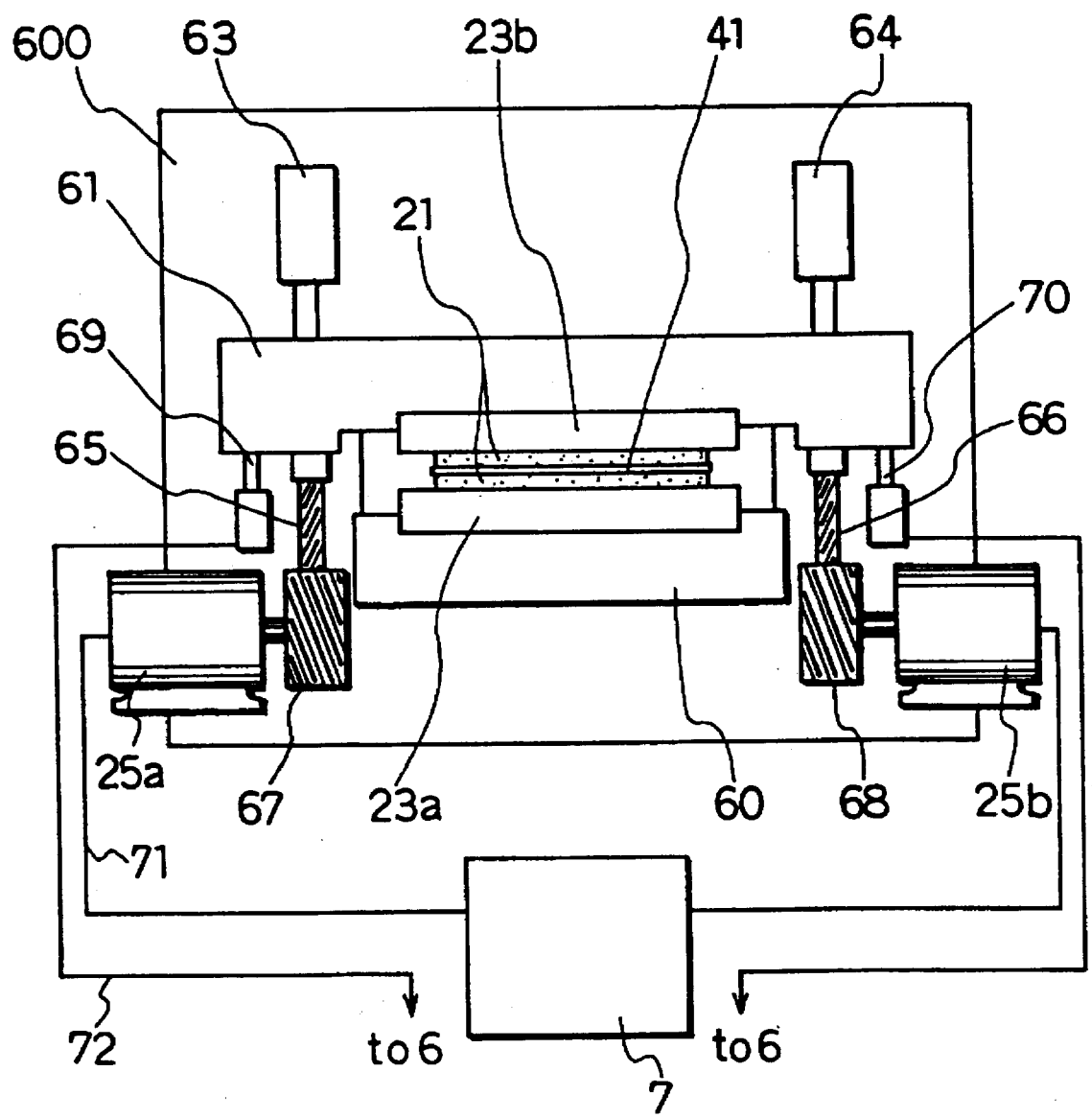
FIG. 8 is a schematic view showing a mechanism for adjusting a gap of a slit composed of a pair of blades.
Figure 9:
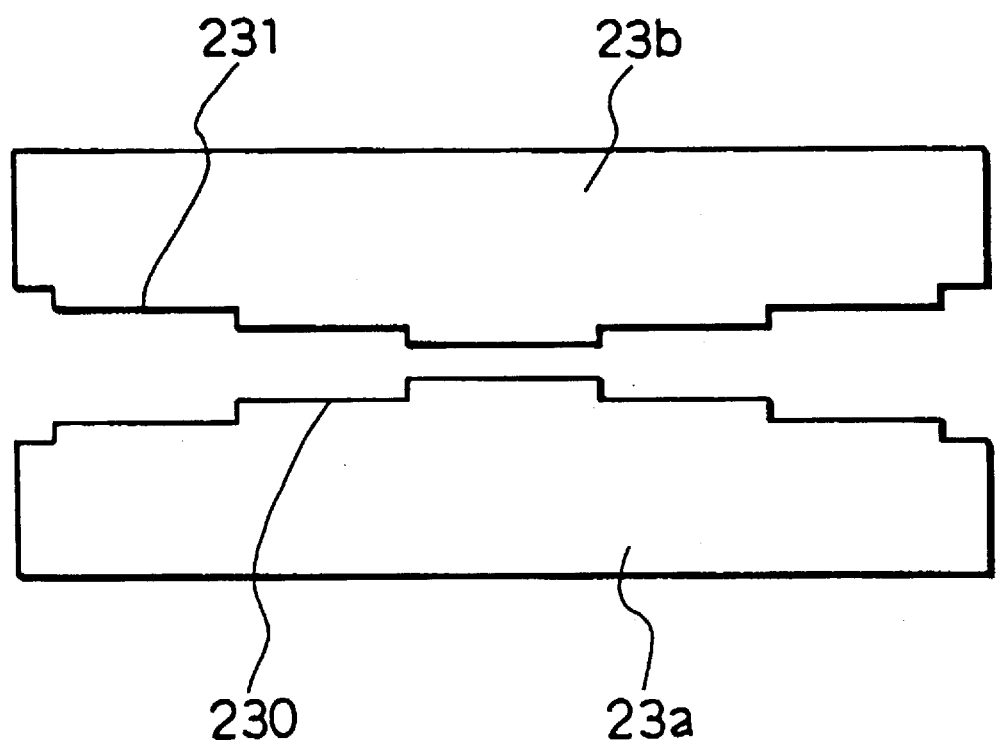
FIG. 9 is a view showing an example of shapes of edges of the pair of the blades.

In FIG. 8, a control current issued form the above-mentioned motor controlling circuit 7 is fed to two stepping motors 25a and 25b through two signal paths 71.

The pair of the blades 23a and 23b which constitute the slit for adjusting the coated pasty mixture are made of a sintered tool alloy containing tungsten carbide or an alloy tool steel, and the blades are fixed to base components 60 and 61, respectively. They are so disposed as to face with each other and to allow a passage of the core sheet coated with the pasty mixture through a central part of the slit. On both of the right and left end of one of the base components, in this example, the base component indicated by numeral 61, pressure-applying devices such as oil cylinders indicated by numerals 62 and 64 are provided, thereby to energize or pressing force the blade 23b with a predetermined force to keep the slit gap constant against the force induced by passing of the core metal sheet 41 with pasty material by constantly pushing the blade 23b toward its partner, the blade 23a.

In this configuration, the blade 23a is securely fixed to the base component 60 which itself is in a fixed state.

Threaded shafts 65 and 66 and provided on the right and left ends of the side of base component 61 which faces the base component 60, and they are meshing with worms 67 and 68, respectively. By rotating the worms 67 68 by the stepping motors 25a and 25b, and thus rotating the threaded shafts 65 and 66, respectively, it is possible to make the blade 23b to get close to or separate from the blade 23a, thereby to adjust the slit gap. Numeral 600 designates a frame as a stationary part.

An actual displacement of the base component 61 which effects the displacement of the blade 23b is detected by linear gauges 69 and 70 provided around on the right and left ends of the base component 61 to its minutes amount. The output signal of the detection is fed to the micro-processing unit 6, wherein it is subjected to a processing operation for correcting the deviation from the reference value and for determining a corrected value, which is then fed back again to the motor controlling circuit 7. In the motor controlling circuit 7, the corrected value acts on the fine adjustments of the motors 25a and 25b, hence on the rotations of the worms 67 and 68.

As far as the facing edges of the both blades 23a and 23b is in parallel, the slit gap determined by the pair of the blades 23a and 23b, in other words, the coated thickness of the pasty mixture, should theoretically be uniform at every position situated throughout the whole span of the core sheet 41. In actual practice however, some of surplus pasty mixture, which have once coated on the core sheet, may sometimes be stripped off from the core sheet by a scraping action of the slit and be allowed to escape to the lower direction, and the right and left end directions of the blade, while demonstrating some flowing resistance. On account of these and other factors, the pasty mixture coated on a central part of the both surfaces of the core sheet 41 tends to be made thicker and heavier than the pasty mixture coated on parts near the both side edge parts of the core sheet 41. The deviation in the coated amount of the pasty mixture also occurs between the right part and left part of the core sheet 41.

In order to decrease such deviation and to maintain a uniform thickness and weight of the coated pasty mixture over the entire width of the core sheet 41, it is therefore advantageous to design each of the both blades to have a moderate arcuate shape, so as to make each of the mid parts of the facing edges of the blades to expand or inflate to get close to its partner, respectively, for negating the above-mentioned phenomenon. Alternatively, it is also advantageous to configure the facing edges of the blades 23a and 23b to have very small steps 230 and 231 as shown by FIG. 9, which create such gap between the facing edges of the blades 23a and 23b which is narrow at the central parts and gradually and stepwisely becomes wider as it gets close to both (right and left) edges. For illustrative purpose, the steps 230 and 231 shown in FIG. 9 are depicted in a considerably larger scale than those of the actual size. Further, the rotations of the worms 67 and 68 by the motors 25a and 25b are also directed to effect the displacement of the blade 23b in a direction of decreasing the above-mentioned deviation.

Figure 10:
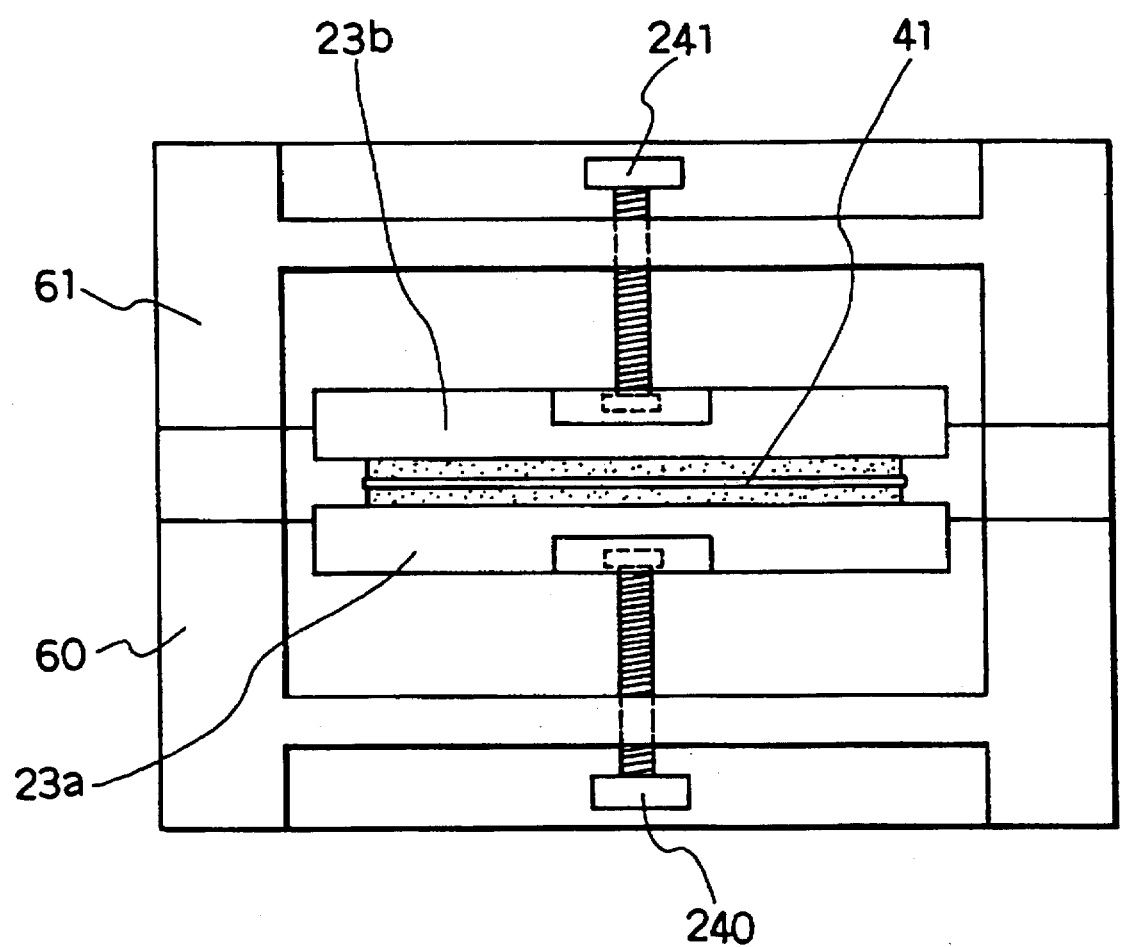
FIG. 10 is a side view showing a configuration of the pair of the blades mounted on base components in their warped state.
Figure 11:
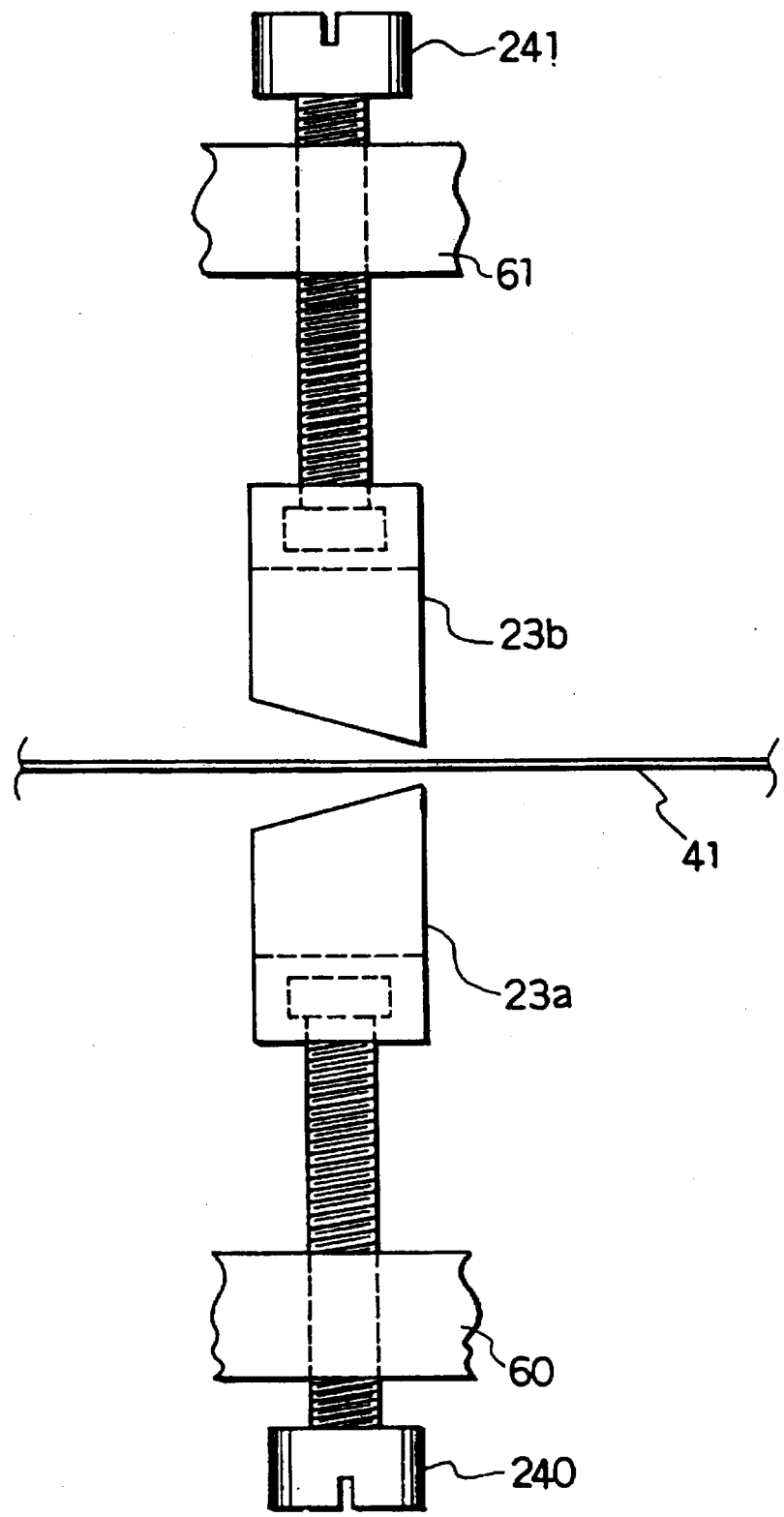
FIG. 11 is a front cross-sectional view showing the pair of the blades mounted on base components with a pair of supporting bolts shown in FIG. 10.

Moreover, in controlling the coating thickness of the pasty mixture, it is also advantageous to configure the adjusting mechanism in a manner that, as shown in FIG. 10, the central parts of the blades 23a and 23b, which correspond to such part of the core sheet that has usually the largest thickness of the pasty mixture, are pushed on their rear part by adjusting bolts 240 and 241 when they are fixed to their base components 60 and 61, thereby to energize each of the mid parts of the blades to warp to that of its partner. The end of the adjusting bolts 240 and 241 are rotatably engaging with the rear part of the blades 23a and 23b, so that the central parts of the blades 23a and 23b can be pulled by the engaging end of the bolts 240 and 241, respectively. By such configuration, the blades can be made warped convex or concave as shown in FIG. 12(A) and FIG. 12(B).

By configuring the adjusting mechanism in the above-mentioned manner with such blades 23a and 23b which are made of an alloy tool steel (for instance, SKD steel, defined by the Japanese Industrial Standard, JIS or DIS G-4404, SKD-11 or ISO D2), which are excellent in its abrasion-resistant property and also have some flexibility) it is possible to unify the thickness and weight of the coated pasty mixture layer by bending the blades convex as shown in FIG. 12(A) or concave as in FIG. 12(B). By virtue of the bending or warpages of the blades, even using such blades with flat edges, it is possible to obtain an arcuate shape, and function to scrape off the surplus pasty mixture, in the adjustment of the coated amount of the pasty mixture toward the reference value over or across the entire width of the core sheet 41.

As clearly demonstrated in the previous description, according to the present invention, it is possible to accurately derive the thicknesses or weights of the coated pasty mixture layers in relation with the weight per unit area, in the process of weight measurement of the pasty mixture coated sheet of electrode. This advantage is brought by allowing a radiation or β ray emitted from a radiation source comprising strontium 90 to transmit through the coated core sheet, by comparing and calibrating the intensity or dosage of the β ray after the transmission in a comparison with a reference value set by using iron as the reference sample, and feeding the comparing and calibrating result value back for the adjustment of the slit gap between the blades.

By these steps, it is possible measure the weight of the pasty mixture coated on the belt-like electrode in a continuous and non-contact basis. This method drastically accelerates the confirmation and the adjustment for the amount of the pasty mixture, and suppresses the hitherto existed low production yield which has been inevitable in the case of mechanical and batch sampling of the electrode by cutting a part or parts of the electrode.

Although the present invention has been described in terms of the presently preferred embodiments, it is to be understood that such disclosures are not to be interpreted as limiting. Various alterations and modifications will no doubt become apparent to those skilled in the art to which the present invention pertains, after having read the above disclosures. Accordingly, it is intended that the appended claims be interpreted as covering all alterations and modifications as fall within the true spirit and scope of the invention.

What is claimed is:

1. An apparatus for coating a pasty mixture comprising:

means mounted on a stationary part of the apparatus for transferring a continuous belt-like metal core sheet along a predetermined transferring path along which a plurality of processing stations are provided;

a hopper which contains said pasty mixture containing an electrode active material as its main ingredient, through which said continuous belt-like metal core sheet passes, for coating said pasty mixture on both faces of said metal core sheet thereby to form layers on respective faces;

a slit which is provided at outlet part of said hopper constituted with a pair of blades made of an ultra hard alloy, through which said metal core sheet with coatings of the pasty mixture passes, whereby the thickness of said coated layers of the pasty mixture are adjusted;

a furnace for drying said coatings of the pasty mixture;

a weight measuring unit including a radiation source provided over one side of said predetermined transferring path, for irradiating said metal core sheet with coatings of pasty mixture with a radiation, and an ionization chamber provided over a second side of the transferring path for detecting trapped dosage of the radiation transmitted through said metal core sheet with coatings of pasty mixture, to issue an electrical output signal corresponding to said dosage, a processing unit for processing the electrical output signal from the weight measuring unit by comparing it with reference data which is based on a previously measured and determined weight of the pasty mixture, thereby issuing a control signal, and means for adjusting a gap of said slit, in compliance with the control signal outputted from said processing unit.

2. The apparatus for coating a pasty mixture in accordance with claim 1, wherein said radiation for irradiating the layers of the coated pasty mixture is β ray, and a gas confined in said ionization chamber which traps the dosage of the β ray transmitted through the layers of the coated pasty mixture is an inert gas.

3. The apparatus for coating a pasty mixture in accordance with claim 2, wherein a radiation source for said β ray is a piece of strontium 90.

4. The apparatus for coating a pasty mixture in accordance with claim 2, wherein a main ingredient of said pasty mixture is cadmium powder and a reference sample employed for simulating β ray measurement is iron.

5. The apparatus for coating a pasty mixture in accordance with claim 1, wherein a radiation source for irradiating said metal sheet with coatings of pasty mixture includes a collimator provided in front of said radiation source for adjusting the intensity of the radiation.

6. The apparatus for coating a pasty mixture in accordance with claim 1, wherein said weight measuring unit is provided in a manner that said radiation source and said ionization chamber are constituting a facing pair which are disposed over and under said predetermined transferring path along which the said metal core sheet with coatings of pasty mixture is being transferred, and are traversing the path along the width of said core sheet.

7. The apparatus for coating a pasty mixture in accordance with claim 1, wherein said means for adjusting a gap of slit between aid pair of blades comprises:

at least one threaded shaft provided on the end of one of the facing pair of blades, at least a worm meshing with the threaded shafts, and at least an electric motor for rotating said worm.

8. The apparatus for coating a pasty mixture in accordance with claim 7, wherein said electric motor for rotating these worm is a stepping motor or a servo motor.

9. The apparatus for coating a pasty mixture in accordance with claim 7, wherein said electric motor for rotating the worm rotates in compliance with the electric output signal from the weight measuring unit, for adjusting the gap of slit between the blade by rotating said worm and said threaded shaft, so as to minimize deviation in the weight per area of the pasty mixture from the reference value.

10. The apparatus for coating a pasty mixture in accordance with claim 1, wherein amounts of the displacements of the blades are continuously detected by linear gauges, and the rotations of the motors are controlled by feeding the output of the detection back to the processing unit.

11. The apparatus for coating a pasty mixture in accordance with claim 1, wherein each of said pair of the blades is fixed to respective base components mounted on a stationary part of the apparatus at its mid-position of the rear faces, by engagement with respective supporting bolts which form fulcrums of warpage.

12. The apparatus for coating a pasty mixture in accordance with claim 1, wherein each of said pair of the blades is finished to have a symmetrical facing edge of an arcuate shape or a stepped shape in a manner that the gap between the edges is narrower at its central part but gradually becomes wider as the gap approaches to the right and left ends thereof.

13. A method for continuously coating on a continuous belt-like metal core sheet a pasty mixture containing an electrode active material powder as its main ingredient comprising the steps of:

continuously coating on both faces of said metal core sheet said pasty mixture by allowing said metal core sheet to pass through a hopper which stores said pasty mixture therein;

adjusting the thickness of the coated pasty mixture by allowing said metal core sheet to pass through a slit for adjusting the coated pasty mixture, said thickness being defined by gap of said slit between a pair of blades and situated close to said hopper;

drying said metal core sheet which has been coated with the pasty mixture;

irradiating the coated and dried metal core sheet with a radiation emitted from a radiation source in a pasty mixture weight measuring unit, trapping dosage of the radiation transmitted through the coated and dried metal core sheet by an ionization chamber and then measuring the weight of the pasty mixture based on the dosage obtained by the trapping operation;

processing the measured value by comparing it with a previously determined reference value of the weight of the pasty mixture and outputting the result of the comparison as an electrical signal; and adjusting a slit gap constant of slit by displacing at least one of said blades by at least one driving source which operates in compliance with said electrical signal, thereby to adjust the weight per unit area of the pasty mixture coated on said metal core sheet.

14. The method for coating a pasty mixture in accordance with claim 13, wherein said pasty mixture weight measuring unit is provided so that said radiation source and said ionization chamber constitutes a facing pair disposed over and under said predetermined transferring path, along which the coated metal core sheet is being transferred in a give direction, and that said pasty mixture weight measuring unit is driven to traverse along a path across width of said core sheet, thereby to continuously and scanningly measure the weight of the whole area of said metal core sheet with the coated pasty mixture.

15. The method for coating a pasty mixture in accordance with claim 13, wherein on respective end parts of said pair of blades there are provided a pair of threaded shafts for adjusting a slit gap between said pair of blades by displacing the blades, a pair of worms meshing with the threaded shafts and driving sources for rotating said worms to be actuated in compliance with the electric output signal given from said pasty mixture weight measuring unit, to constantly adjust said gap of slit.

16. The method for coating a pasty mixture in accordance with claim 15, wherein said electric output signal is processed by a micro-processor unit, for actuating the motors for driving the worms to rotate said threaded shafts.

17. The method for coating a pasty mixture in accordance with claim 13, wherein said radiation is β ray, the dosage of the β ray transmitted through the metal core sheet having layers of the coated pasty mixture is detected by said ionization chamber, the detected value is used for comparing it with a reference value which has previously been determined based on iron as a reference sample to issue an electrical output signal for adjusting said gap of slit, and the output signal is fed to a driving source for displacing the blades, for adjusting said slit gap constant by operating said driving source.

18. The method for coating a pasty mixture in accordance with claim 13, wherein said processing unit is a microprocessor unit for processing the measured value on the dosage of the radiation transmitted through the metal core sheet with the pasty mixture comparing it with the previously determined reference value of weight of the pasty mixture and outputting the result of the processing as an electrical signal.

* * * * *